Dec. 17, 1957  D. A. HUFFMAN  2,816,954
INFRA-RED TELEVISION CAMERA
Filed Oct. 23, 1952  2 Sheets-Sheet 1

INVENTOR.
DAVID A. HUFFMAN
BY James S. Shannon
AGENT
Wade Koontz
ATTORNEY

Dec. 17, 1957     D. A. HUFFMAN     2,816,954
INFRA-RED TELEVISION CAMERA

Filed Oct. 23, 1952     2 Sheets-Sheet 2

INVENTOR.
DAVID A. HUFFMAN
BY James S. Shannon
AGENT
Wade Koontz AND
ATTORNEY

2,816,954
INFRA-RED TELEVISION CAMERA

David A. Huffman, Cambridge, Mass., assignor to the United States of America as represented by the Secretary of the Air Force Application October 23, 1952, Serial No. 316,402

10 Claims. (Cl. 178—7.2)

This invention relates to television cameras and in particular to a television camera sensitive to radiation in the far infra-red region of the spectrum.

It is the object of the invention to provide a camera capable of converting infra-red radiation into an electrical video signal. It is a further object of the invention to provide a camera utilizing an infra-red sensitive material of the variable resistance type such as lead sulphide. Lead sulphide is particularly desirable because of its relatively high resistivity and rapid response, the latter quality permitting frame frequencies approaching one hundred per second.

There are two main problems inherent in the design of an infra-red camera using lead sulphide as the sensitive material, both arising from the peculiar properties of this material. First, the effect of infra-red radiation on lead sulphide is to change its resistance, which introduces the problem of converting such resistance change into a voltage change in the production of a video signal. Secondly, it is a property of lead sulphide that the surface resistance and sensitivity of a film of the material vary considerably over the film surface, which introduces the problem of preventing such variations from affecting the video signal which should represent changes due to illumination only.

In accordance with the invention the camera consists of a cathode-ray tube having a lead sulphilde mosaic, an optical system for forming an infra-red image of the field of view upon the mosaic and a shutter synchronized with the vertical scan of the cathode-ray tube so that infra-red radiation is admitted to the mosaic during alternate frames only. The mosaic consists of a sheet of dielectric material having on one side a film of lead sulphide with means for establishing a potential gradient therein. The other is is scanned by the electron beam of the cathode-ray tube and has a barrier screen placed close thereto to collect secondary electrons emitted by the dielectric sheet during scanning. The varying secondary electron current constitutes the output signal of the tube.

A more detailed explanation of the invention will be made in connection with the accompanying drawings, in which—

Figure 1:
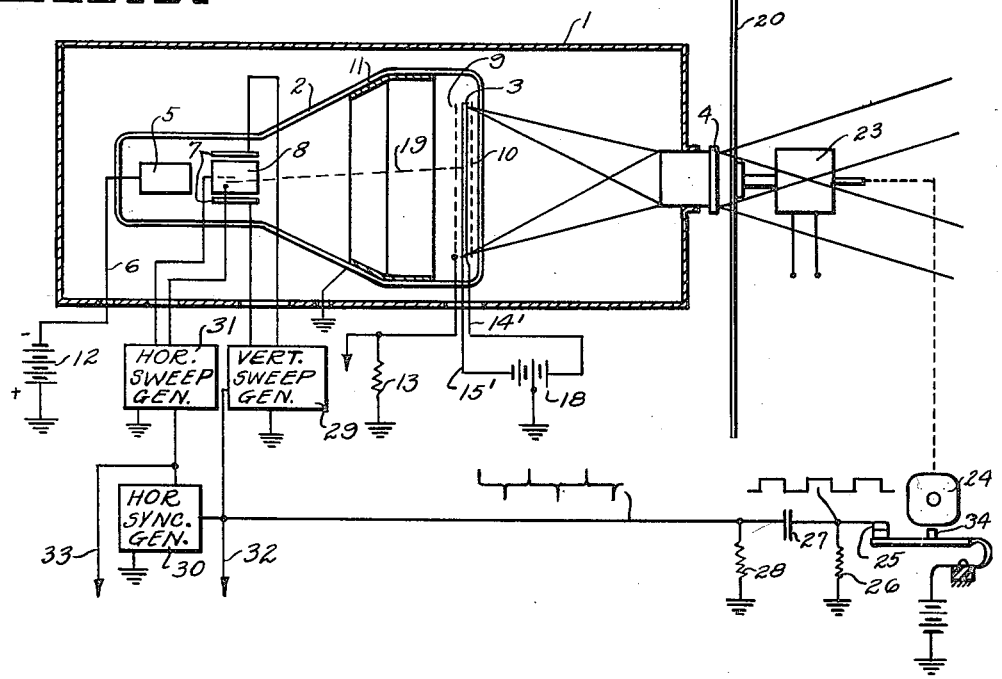
Figure 2:
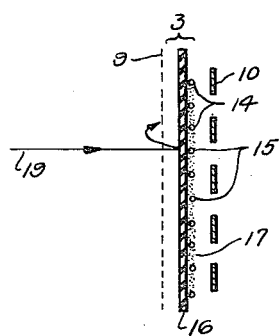
Figure 3:
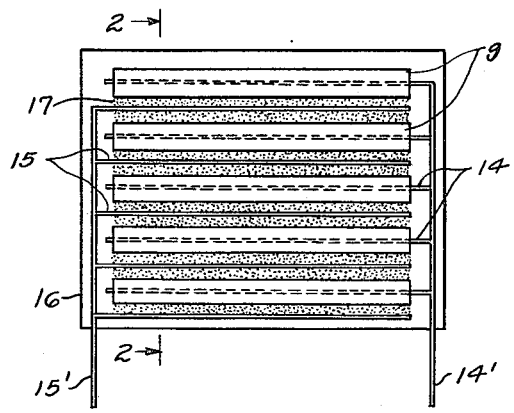
Figure 5:
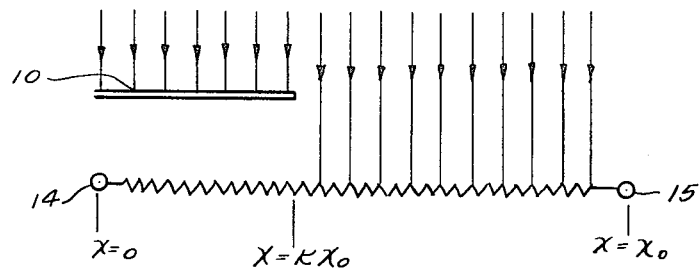
Figure 4:
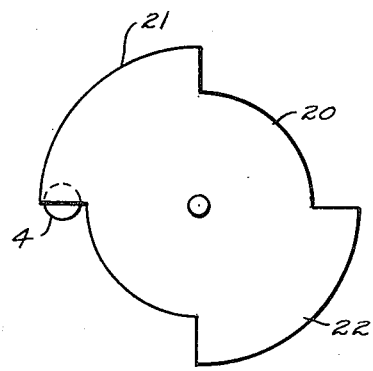

Fig. 1 shows schematically a complete camera assembly;
Figs. 2 and 3 show the mosaic details;
Fig. 4 shows the shutter used with the camera; and
Fig. 5 is the equivalent circuit of a mosaic element.

Referring to Fig. 1 the camera comprises a case 1 containing a cathode-ray tube 2 having a mosaic 3 upon which an image of the field of view is formed by a suitable infra-red optical system 4. The cathode-ray tube contains an electron gun 5 for producing a beam of electrons. The gun 5 is conventional and therefore its details are not shown, however, it contains a cathode as one element and lead 6 is connected thereto. Conventional electrostatic vertical and horizontal deflection plates 7 and 8 are also provided. A barrier grid 9 is positioned close to and parallel to the beam side of mosaic 3 while a shading grid 10 is positioned close to and parallel to the image side of the mosaic. The tube also has a metallic inner coating 11. Coating 11 and grid 9 are maintained at a high positive potential relative to the cathode in gun 5 by means of direct voltage source 12. Resistor 13 serves as an output load resistor across which the video output signal is developed.

The construction of mosaic 3 and associated grids 9 and 10 is shown in Figs. 2 and 3. The mosaic consists of a sheet of insulating material 16, such as mica, on which is deposited a film of lead sulphide 17. Imbedded in the lead sulphide so as to make electrical contact therewith are two interlaced sets of parallel equally spaced conductors 14 and 15, the sets of conductors being connected to leads 14' and 15' respectively. A conductive barrier screen 9 is positioned close and parallel to the rear surface of sheet 16. A shading grid 10, made of any suitable material opaque to infra-red radiation, is positioned parallel to the front surface of sheet 16 and is so located as to shade one-half of the lead sulphide film between each pair of adjacent conductors 14, 15. The necessity for the shading grid will be demonstrated later. The illustrations in Figs. 2 and 3 are not drawn to scale in order to illustrate the relative positions of conductors and shading grid more clearly. In an actual embodiment of the mosaic assembly, an active area two inches square with about forty of the conductors 14, 15 per inch would be suitable. For the barrier grid 9 a wire screen having a mesh of two hundred per inch is satisfactory.

The manner in which the cathode ray tube 2 of Fig. 1 operates to produce a video signal will now be considered. Since, as already pointed out, the effect of infra-red radiation on lead sulphide is to produce a change in its resistance, it is necessary to establish a potential gradient in the lead sulphide film of the mosaic. This is accomplished by inserting a source of direct voltage 18 between leads 14' and 15' which are connected to conductor sets 14 and 15, respectively. A high velocity beam of electrons 19, generated by gun 5, is caused to line scan the rear surface of sheet 16 by suitable vertical and horizontal sweep voltage applied to deflection plates 7 and 8 respectively. When the beam strikes the surface of the insulating material secondary electrons are liberated therefrom, more or less of which reach grid 9 depending upon the potential of this grid relative to that of the elemental area of sheet 16 on which the beam is impinging. If the grid has a higher potential than the elemental area a comparatively greater number of secondary electrons will be lost causing the potential of the elemental area to rise. If the area potential is higher than that of the grid comparatively fewer secondary electrons will reach the grid and the area potential will therefore fall. The net result is that the elemental area adjusts itself to an equilibrium potential at or near that of grid 9 at which the number of primary electrons arriving is just balanced by an equal number of secondary electrons lost to the grid 9. The same process occurs with respect to every other elemental area on the rear surface of sheet 16 so that after a complete scanning the entire surface is at the equilibrium potential. The equilibrium potential on the rear surface of sheets 16 is independent of the potentials on the front surface if the insulating material used has a high coefficient of volume resistance.

The voltages of the elemental areas of the front surface of sheet 16 are not uniform. This nonuniformity is due to the potential gradient established in the lead sulphide film and also to the already mentioned inherent nonuniformity in the resistance of lead sulphide films. When the mosaic is subjected to infra-red radiation the nonuniformity is still further increased due to the effect of the radiation on the resistance of the lead sulphide. Consider first the situation in which no infra-red radiation reaches the mosaic, hereafter referred to as the "dark" condition of the mosaic. The small volume of dielectric situated between any pair of corresponding rear and front elemental areas of the sheet 16 constitutes in effect an elemental condenser and the sheet 16 may be considered as made up of a multitude of such elemental condensers. After the rear surface of sheet 16 has been scanned by the electron beam all of the rear elemental areas will be at the same equilibrium potential. However, the front elemental areas have various potentials so that the above mentioned elemental condensers making up sheet 16 have various charges and these charges remain substantially unchanged between scans since the discharge path impedance of each of the elemental condensers is extremely high except when the electron beam is in contact with the rear elemental area of the condenser. Therefore, as long as the "dark" condition exists the potential of the rear surface of sheet 16 remains uniform at the equilibrium value and the secondary electron current to grid 9 remains constant. This current flowing through resistor 13 establishes a constant direct voltage thereacross, the alternating or signal component of the output voltage being zero.

When an infra-red image is focussed on the sensitive surface of the mosaic, this condition being referred to as the "light" condition of the mosaic, the potential distribution on the front surface is changed from that existing during the "dark" condition. This results from a change in resistance of the unshaded portions of the lead sulphide film on which the radiation falls. Since the charging path impedances of the elemental condensers are extremely high and since as a result, there can be no appreciable change of charge between scans, the rear elemental area potential of each elemental condenser must follow any change in the front elemental area potential of the condenser. Therefore, the presence of an infra-red image on the mosaic produces a representative potential distribution among the rear elemental areas constituting the rear surface of sheet 16. The next scan following illumination of the mosaic restores each of the rear elemental areas to the equilibrium potential and in so doing causes an increase or decrease in the secondary electron flow to grid 9 depending upon whether the area potential was below or above the equilibrium value. This varying secondary electron current flowing through resistor 13 produces a varying voltage thereacross which constitutes the video signal. Since the first scan returns the rear surface of sheet 16 to the equilibrium potential subsequent scans will produce no video signal unless there is a change in the illumination of the mosaic and then the signal will be representative only of the change in illumination.

In order to provide a continuous video signal output that is representative of the total illumination it is necessary that the mosaic be scanned alternately under "light" and "dark" conditions. The process is as follows: Assuming for simplicity that the infra-red image remains unchanged for several frames, the "light" scan produces a video signal by returning the rear elemental areas to the equilibrium potential. Following this scan the mosaic is darkened, which changes the potential distribution on the front of the mosaic and results in the rear elemental areas assuming a corresponding potential distribution. The succeeding "dark" scan again returns the elemental areas to the equilibrium potential and in so doing generates a video signal of opposite phase to that produced by the "light" scan. After the "dark" scan the mosaic is again illuminated and the ensuing "light" scan produces a video signal of the same phase as the preceding "light" scan. Therefore, two identical video signals of opposite phase are produced across resistor 13 by the tube. Amplitude selection may be used to separate out one of the signals.

A simple mechanical shutter for alternately exposing and shielding the mosaic from infra-red radiation is shown in Figs. 1 and 4. A disc 20 having 90° extensions 21 and 22 is rotated at constant speed in front of the lens 4 by motor 23. A simple synchronizing mechanism is also shown in Fig. 1. A four lobe cam 24 is mounted on the shaft of motor 23 and serves to open breaker points 25 four times in each revolution of the shutter disc. This generates a square voltage wave across resistor 26 which is differentiated by differentiating circuit 27—28 to produce a series of sharp positive and negative pulses, the latter coinciding with the breaking of contacts 25. Vertical sweep generator 29 is triggered by the negative pulses only, producing a saw-tooth voltage for each negative pulse which voltage is applied to vertical deflecting plates 7. The vertical synchronizing pulses may also be applied to a horizontal synchronizing pulse generator 30 to synchronize this generator at the beginning of each frame. The horizontal synchronizing pulses produced by generator 30 are applied to horizontal sweep generator 31 to initiate horizontal sweep voltages which are applied to horizontal deflecting plates 8. Vertical and horizontal synchronizing pulses are available also on conductors 32 and 33 for use where needed in associated equipment. The timing of the vertical sweep relative to the shutter is accomplished by angular adjustment of the cam follower 34 relative to the cam. The adjustment should be such that the vertical sweep does not start until after the mosaic has been either fully illuminated or fully darkened. For a frame frequency of 40 per second with the arrangement shown the shutter speed would be 600 revolutions per minute. The horizontal sweep frequency should be such as to give about 350 horizontal lines for a two-inch square mosaic. Any suitable type shutter and synchronizing mechanism may of course be used, the foregoing apparatus being shown by way of example only.

The necessity for the shading grid 10 may be shown in connection with Fig. 5. This figure shows the equivalent circuit of a mosaic element, i. e., the lead sulphide film located between two conductors 14, 15. The film is shown as a resistance partially shaded from infra-red radiation by shading grid 10. During the "dark" frame, when no radiation reaches the mosaic, the current in a mosaic element is (1) $$I_1 = \frac{E_0}{r \overline{X}_0}$$

where $r$=coefficient of linear resistance of unilluminated mosaic element.

During the "light" frame, when radiation reaches the mosaic, the element current is (2) $$I_2 = \frac{E_0}{K X_0 r + (1-K) X_0 r (1-S)}$$

This current is a function of S, the fractional change in $r$ due to illumination. The unilluminated potential at the general position X is (3) $$E_{1(0 < X < X_0)} = \frac{E_0 X}{X_0}$$

The illuminated potential at position X is (4) $$E_{2(0 < X < K X_0)} = \frac{E_0 X}{K X_0 + (1-K)(1-S) X_0}$$

or (5) $$E_{2(K X_0 < X < X_0)} = E_0 \left[ \frac{K X_0 + (X - K X_0)(1-S)}{K X_0 + (1-K) X_0 (1-S)} \right]$$

The unilluminated potential at the position $X = KX$ is (6) $$E_{K1} = K E_0$$

and the illuminated potential at this position is (7) $$E_{K2} = \frac{E_0 K}{K + (1-K)(1-S)}$$

The change in potential X due to illumination is, from Equations 3 and 4

$$(8) \quad E_{(0<X<KX_0)} = E_2 - E_1 = \frac{E_0 X}{X_0}\left[\frac{S(1-K)}{1-S(1-K)}\right]$$

and from Equations 3 and 5

$$(9) \quad E_{(KX_0<X<X_0)} = E_2 - E_1 = \frac{E_0(X_0-X)SK}{X_0[1-S(1-K)]}$$

If there are no shading grid bars ($K=0$) it can be seen from (9) that there is no change in voltage at any point between the conductors 14, 15. If a shading grid is present, (8) shows that maximum voltage change occurs at $X=KX_0$ (the edge of the shading grid bar).

The change in potential at $X=KX_0$ due to illumination is, from Equations 6 and 7

$$(10) \quad E_K = E_{K2} - E_{K1} = \frac{E_0 KS(1-K)}{1-S(1-K)}$$

When (10) is maximized with respect to K, the result is $$(11) \quad K = \frac{S-1+\sqrt{1-S}}{S}$$

The term S has been defined as the fractional change in $r$ due to illumination and is in general extremely small. The value of K for small values of S may therefore be found finding the limit of K as S approaches zero. Determination of this limit gives $K=\frac{1}{2}$. Substituting this value of K in (10)

$$(12) \quad E_K = \frac{SE_0}{4(1-S/2)} \cong \frac{SE_0}{4}$$

for small values of S. This equation represents the maximum voltage change to be expected from the analyzed system.

From the above it is seen that the shading grid is necessary to produce any voltage change as a result of illumination and that, for small values of S, the voltage change is maximum when the shading grid bars shade one-half of the infra-red film between each pair of conductors 14, 15.

I claim:

1. An infra-red sensitive cathode-ray camera tube containing a mosaic comprising a sheet of dielectric material coated on the front surface with a film of lead sulphide, means dividing said film into identical rectangular elemental areas, means for establishing uniform different potentials at opposite edges of each elemental area for producing a potential gradient in the film between said opposite edges, means for admitting infra-red radiation to said film, means for shading a portion of each of said elemental areas from said radiation, said shaded portion extending from one of said opposite edges to a line parallel to and between said opposite edges, means for scanning the rear surface of said sheet with the beam of said cathode-ray tube, electrode means for receiving secondary electrons emitted by said rear surface, and means for connecting said electrode means to an output circuit.

2. An infra-red sensitive camera comprising a cathode ray tube having a mosaic comprising a sheet of dielectric material coated on the front surface with a film of lead sulphide, means dividing said film into identical rectangular elemental areas, means for establishing uniform different potentials at opposite edges of each elemental area for producing a potential gradient in the film between said opposite edges, means including a shutter for alternately admitting and blocking infra-red radiation to said film for equal intervals of time, means for shading a portion of each of said elemental areas from said radiation, said shaded portion extending from one of said opposite edges to a line parallel to and between said opposite edges, means for scanning the rear surface of said sheet with the beam of said cathode ray tube, electrode means for receiving secondary electrons emitted by said rear surface, an output circuit connected to said electrode means, and synchronizing means between said shutter and said scanning means for initiating one scan of said rear surface during each of said intervals.

3. An infra-red sensitive television camera tube, said tube containing: a mosaic comprising a flat sheet of dielectric material, a film of lead sulphide on one side of said sheet, and means for dividing said film into a plurality of identical rectangular elemental areas; means for establishing uniform different potentials at opposite edges of each elemental area for producing a potential gradient in the film between said opposite edges; a conductive barrier screen positioned close to and parallel to the other side of said sheet; means for forming a high velocity beam of electrons directed toward said other side of said sheet through said barrier screen; means for deflecting said beam over the surface of said other side in accordance with applied scanning voltages; means for connecting said beam forming means, said deflecting means, said barrier screen and said film to circuits external to said tube; means for admitting infra-red radiation to said film of lead sulphide; and means for shading a portion of each of the elemental areas of said film from said radiation, said shaded portion extending from one of said opposite edges to a line parallel to and between said opposite edges.

4. An infra-red sensitive television camera tube, said tube containing: a mosaic comprising a flat sheet of dielectric material, a film of lead sulphide on one side of said sheet, a plurality of parallel equally spaced conductors imbedded in said film and making electrical contact therewith, means connecting alternate conductors together to group said conductors into two interlaced sets; a conductive barrier screen positioned close to and parallel to the other side of said sheet; means for forming a high velocity beam of electrons directed toward said other side of said sheet through said barrier screen; means for deflecting said beam over the surface of said other side in accordance with applied scanning voltages: means for connecting said beam forming means, said deflecting means, said barrier screen and said sets of interlaced conductors to circuits external to said tube; means for admitting infra-red radiation to said film of lead sulphide; and a shading grid positioned close to and parallel to said film for shading a portion of each film element located between adjacent conductors from said radiation, the shaded portion of each film element extending from one of said adjacent conductors to a line parallel to and between said adjacent conductors.

5. Apparatus as claimed in claim 4 in which said shading grid consists of a plurality of parallel strips of a material opaque to infra-red radiation, said strips being positioned over and centered relative to the conductors of one of said sets.

6. Apparatus as claimed in claim 5 in which said strips have sufficient width to extend half the distance between adjacent conductors.

7. An infra-red sensitive television camera comprising: a cathode-ray tube; a mosaic in said tube comprising a flat sheet of dielectric material, a film of lead sulphide on one side of said sheet, and means for dividing said film into a plurality of identical rectangular elemental areas; means for establishing uniform different potentials at opposite edges of each elemental area for producing a potential gradient in the film between said opposite edges; a conductive barrier screen positioned close to and parallel to the other side of said sheet; means including a cathode for forming a high velocity beam of electrons directed toward said other side of said sheet through said barrier screen; vertical and horizontal beam deflecting means in said tube; vertical and horizontal sweep voltage generating means connected to said vertical and horizontal deflecting means respectively; means for maintaining said barrier screen and said lead sulphide film at a high positive potential relative to said cathode; an output load impedance connected in circuit with said barrier screen; means in said tube for admitting infra-red radiation to said film of lead sulphide; means for shading a portion of each of the elemental areas of said film from said radiation, said shaded portion extending from one of said opposite edges to a line parallel to and between said opposite edges; shutter means for alternately blocking and passing infra-red radiation to said tube for equal intervals of time; and synchronizing means between said shutter and said vertical sweep voltage generating means for initiating one vertical sweep during each of said intervals.

8. An infra-red sensitive television camera comprising: a cathode-ray tube; a mosaic in said tube comprising a flat sheet of dielectric material, a film of lead sulphide on one side of said sheet, a plurality of parallel equally spaced conductors imbedded in said film and making electrical contact therewith, and means connecting alternate conductors together to group said conductors into two interlaced sets; a conductive barrier screen positioned close to and parallel to the other side of said sheet; means including a cathode for forming a high velocity beam of electrons directed toward said other side of said sheet through said barrier screen; vertical and horizontal beam deflecting means for causing said beam to scan the said other side of said sheet; means for maintaining a fixed potential difference between said sets of conductors; means for maintaining said barrier screen and said lead sulphide film at a high positive potential relative to said cathode; an output load impedance connected in circuit with said barrier screen; means in said tube for admitting infra-red radiation to said film of lead sulphide; means for shading a portion of each film element located between adjacent conductors from said radiation, the shaded portion of each film element extending from one of said adjacent conductors to a line parallel to and between said adjacent conductors; shutter means for alternately blocking and passing infra-red radiation to said tube for equal intervals of time; and synchronizing means between said shutter and said vertical beam deflecting means for initiating one complete scan of the said other surface of said sheet during each of said intervals.

9. Apparatus as claimed in claim 8 in which said shading means comprises a shading grid consisting of a plurality of parallel strips of a material opaque to infra-red radiation, said strips being positioned over and centered relative to the conductors of one of said sets.

10. Apparatus as claimed in claim 9 in which said strips extend one-half the distance between adjacent conductors.

References Cited in the file of this patent

UNITED STATES PATENTS

| | | |
|---|---|---|
| 1,939,649 | McCreary | Nov. 21, 1933 |
| 2,150,160 | Gray | Mar. 14, 1939 |
| 2,236,172 | Gray | Mar. 25, 1941 |
| 2,260,709 | Gray | Oct. 28, 1941 |
| 2,544,261 | Gibson | Mar. 6, 1951 |
| 2,555,091 | Lubszynski | May 29, 1951 |
| 2,588,254 | Lark-Horovitz | Mar. 4, 1952 |